United States Patent [19]
Alesso et al.

[11] Patent Number: 6,152,467
[45] Date of Patent: *Nov. 28, 2000

[54] MOTOR-VEHICLE REAR SUSPENSION

[75] Inventors: Guido Alesso; Michele Spina; Silvano Sandri, all of Orbassano, Italy

[73] Assignees: C.R.F. Societa' Consortile per Azioni of Orbassano (Torino); Consiglio Nazionale Delle Ricerche, Rome, both of Italy

[ * ] Notice: This patent issued on a continued prosecution application filed under 37 CFR 1.53(d), and is subject to the twenty year patent term provisions of 35 U.S.C. 154(a)(2).

[21] Appl. No.: 09/051,055

[22] PCT Filed: Sep. 26, 1996

[86] PCT No.: PCT/EP96/04196

§ 371 Date: Jun. 1, 1998

§ 102(e) Date: Jun. 1, 1998

[87] PCT Pub. No.: WO97/12770

PCT Pub. Date: Apr. 10, 1997

[30] Foreign Application Priority Data

Oct. 2, 1995 [IT] Italy ................... T095A0784

[51] Int. Cl.[7] .................................................. B60G 3/12
[52] U.S. Cl. ............................. 280/124.13; 280/124.149; 280/124.166
[58] Field of Search ................. 280/124.13, 124.149, 280/124.166, 124.134, 124.135, 124.137, 124.152, 124.107; 267/188

[56] References Cited

U.S. PATENT DOCUMENTS

| | | |
|---|---|---|
| 2,702,701 | 3/1955 | Thorne et al. . |
| 3,473,821 | 10/1969 | Barenyi et al. ............ 280/124.111 |
| 4,132,431 | 1/1979 | Von Der Ohe ............ 280/124.166 |
| 4,213,632 | 7/1980 | Stotz et al. ............... 280/124.108 |
| 4,234,205 | 11/1980 | Thiesce ..................... 280/124.107 |
| 4,261,591 | 4/1981 | Warne, Jr. .................. 280/124.13 |
| 4,491,341 | 1/1985 | Maebayashi . |
| 4,715,615 | 12/1987 | Kijima et al. . |
| 5,013,166 | 5/1991 | Domer ............................ 384/220 |
| 5,263,736 | 11/1993 | Stevens ........................ 280/6.157 |
| 5,277,450 | 1/1994 | Henschen ..................... 280/6.151 |
| 5,378,010 | 1/1995 | Marino et al. ............. 280/124.107 |
| 5,409,254 | 4/1995 | Minor et al. ............... 280/124.166 |

FOREIGN PATENT DOCUMENTS

| | | |
|---|---|---|
| 1162702 | 2/1964 | Germany . |
| 2123666 | 11/1972 | Germany . |
| 5822705 | 2/1983 | Japan . |

*Primary Examiner*—Paul N. Dickson
*Attorney, Agent, or Firm*—Sughrue, Mion, Zinn, Macpeak & Seas, PLLC

[57] ABSTRACT

There is described a motor vehicle rear suspension comprising, for each wheel, a longitudinal arm carrying the wheel and pivotally mounted onto the fixed structure of the motor vehicle around a transverse axis. The arm includes a torsionally deformable blade arranged substantially in a longitudinal vertical plane and an auxiliary arm connected to the fixed structure of the motor vehicle with the interposition of an articulated rod element and is further connected to the fixed structure of the motor vehicle by means of a transverse rod.

2 Claims, 4 Drawing Sheets

MOTOR-VEHICLE REAR SUSPENSION

BACKGROUND OF THE INVENTION

The present invention relates to motor-vehicle rear suspensions of the type which comprises, for each wheel:

a longitudinal arm, having one end pivotally mounted on the fixed structure of the motor-vehicle around an axis directed transversally to the longitudinal direction of the motor-vehicle and the opposite end carrying a respective wheel hub, an auxiliary arm connected to the longitudinal arm and having one end connected to the fixed structure of the motor-vehicle, an articulated rod element interposed in the connection between the auxiliary arm and the fixed structure of the motor-vehicle, a further connecting rod interposed between a longitudinal arm and the fixed structure of the motor-vehicle and directed transversally to the longitudinal direction of the motor-vehicle, and resilient and damping means interposed between the longitudinal arm and the fixed structure of the motor-vehicle.

A suspension of the above indicated type is for instance described and illustrated in German patent application DE-A-34 26 942.

SUMMARY OF THE INVENTION

The object of the present invention is that of providing a motor-vehicle rear suspension of the above indicated type which has reduced dimensions and weight while insuring a good behaviour of the motor-vehicle in any travel condition.

In order to achieve this object, the invention provides a rear suspension of the above indicated type, characterized in that the portion of the longitudinal arm which is pivotally mounted around said transverse axis on the fixed structure of the motor-vehicle is constituted by a torsionally deformable blade, arranged substantially in a vertical longitudinal plane, in that said resilient means are constituted by a torsion bar directed along said transverse articulation axis of the longitudinal arm, said torsion bar having one end anchored to the fixed structure of the motor-vehicle and the opposite end rigidly connected to said blade, and in that the torsion bar is of tubular shape and has inside thereof an anti-rolling bar rigidly connected at its ends to the blades associated with the two longitudinal arms of the suspension.

In a preferred embodiment, the blade and said articulated rod element are connected to a frame on which they are pre-assembled, this frame being fixed to, the fixed structure of the motor-vehicle and including a hollow cylindrical body directed along said transverse axis, inside which the end of said torsion bar which is anchored to said blade is rotatably mounted. It is to be noted that rear suspensions having longitudinal arms in forms of blades are known also from DE-A-2 123 666, DE-B-1 162 702, FR-A-2 400 441. However, the above defined structure and arrangement of the suspension of the present invention is not anticipated nor suggested by the prior art.

BRIEF DESCRIPTION OF THE DRAWINGS

The invention will be now described with reference to the annexed drawings, given purely by way of non limiting example, in which.

DETAILED DESCRIPTION OF THE INVENTION

Figure 1:
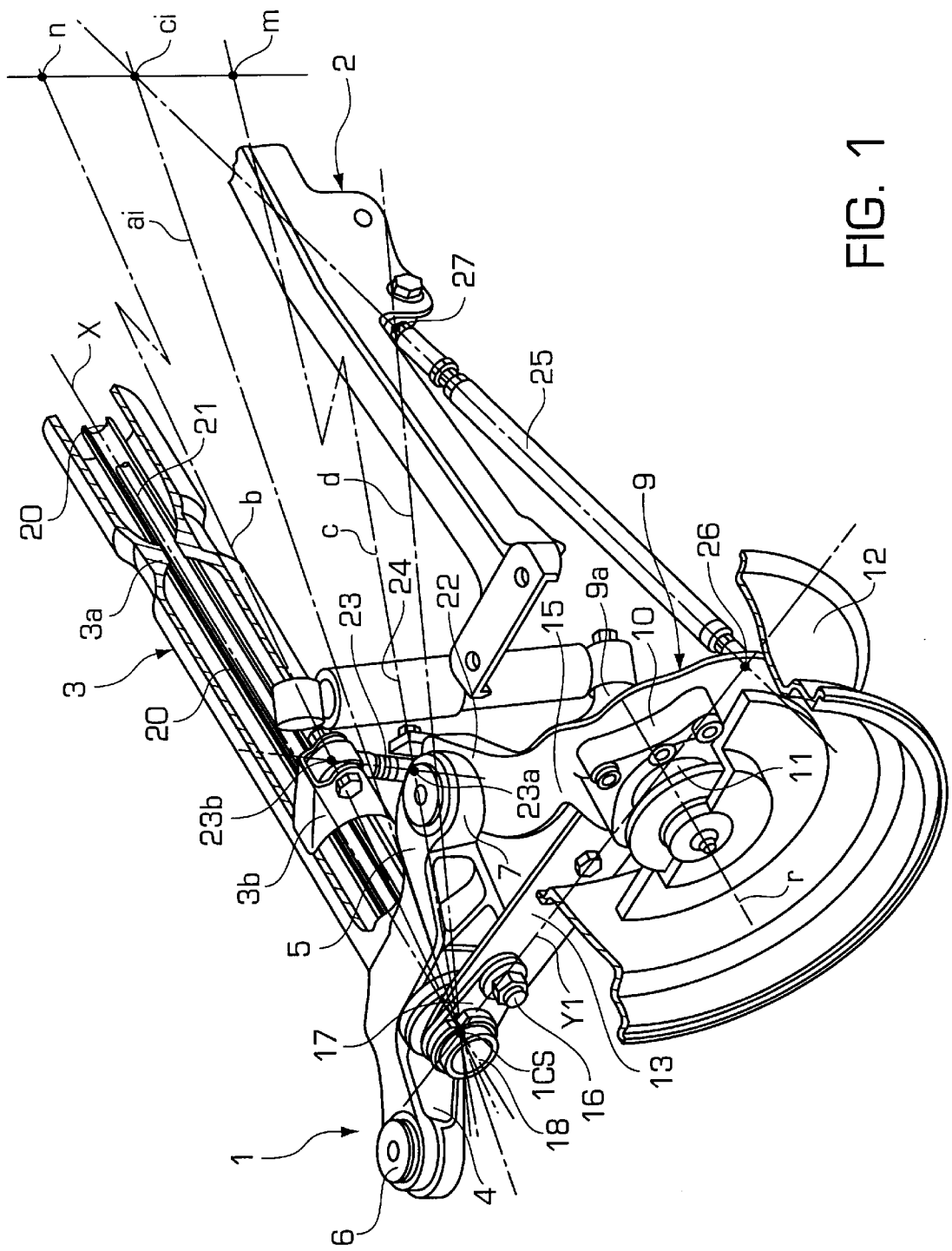
FIG. 1 is a perspective view of the portion of the motor-vehicle rear suspension according to the invention which is associated with the left rear wheel of the motor-vehicle.

In the drawings, there is illustrated a preferred embodiment of the suspension according to the invention in which the various portions of the suspension are mounted on two auxiliary frames 1, 2 which on their turn are fixed to the motor-vehicle structure. It is thus possible, according to a technique known per se, to pre-assemble the various parts of the suspension on the auxiliary frames 1, 2 and then to assemble in a single operation the whole assembly constituted by the auxiliary frames 1, 2 and the suspension on the motor-vehicle structure. Naturally, however, the invention is applicable also by providing auxiliary frames having a shape different from that shown in the drawings, or a single auxiliary frame which supports all the various components of the suspension, or even by having the various parts of the suspension being mounted onto the motor-vehicle structure.

Figure 2:
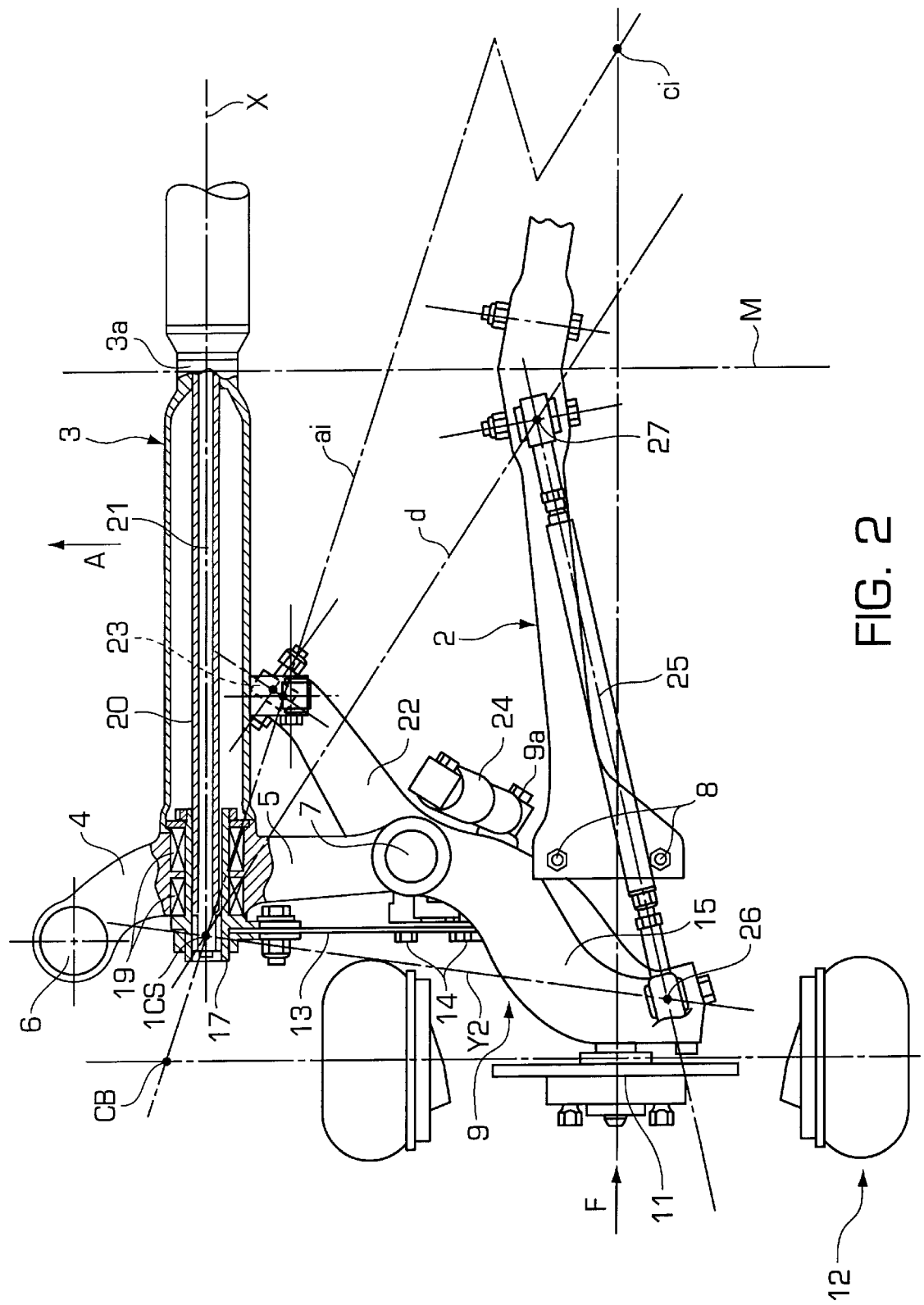
FIG. 2 is a plan view of the device of FIG. 1.
Figure 3:
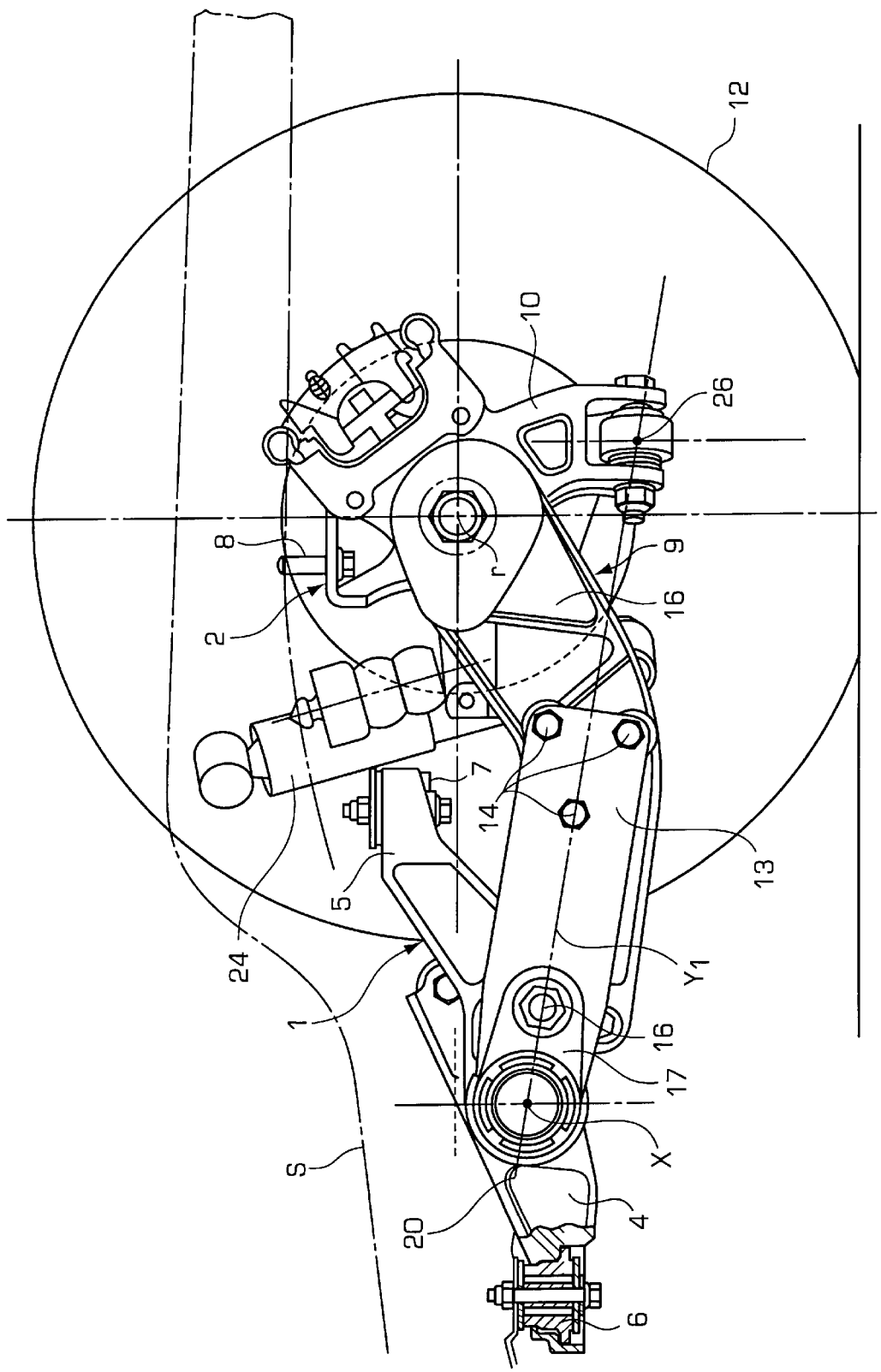
FIG. 3 is an elevational side view of the device of the FIG. 1.

In the case of the illustrated example, the auxiliary frame 1 comprises a hollow cylindrical body 3 arranged along an axis x which is directed transversally to the longitudinal direction of the motor-vehicle (in FIG. 2, arrow A designates the direction of movement). The hollow cylindrical body 3 is supported at each end by a pair of arms 4, 5 which extend respectively along a substantially longitudinal direction forwardly and rearwardly of the hollow cylindrical body 3 and have their ends connected to body S of the motor-vehicle (shown with dotted lines in FIG. 3) by means of rubber damping supports 6, 7.

The auxiliary frame 2 is constituted by a cross-member structure having each of its ends screwed to body S by screws 8.

The reference 9 generally designates the structure of a longitudinal arm having one rear end connected to a wheel support 10 which rotatably supports the hub 11 of a wheel 12 around an axis r.

The longitudinal arm 9 is pivotally mounted around axis x onto the auxiliary frame 1. In the embodiment shown in the drawings, this pivotal assembling is provided by a torsionally deformable blade 13 which is arranged substantially in a vertical longitudinal plane and has one end rigidly connected by screws 14 to a structure 15 forming the body of the longitudinal arm 9. The opposite end of blade 13 is welded and fixed by a bolt 16 to a plate 17 (FIG. 2) which is rigidly connected to a bush 18 which is rotatably supported around axis x by the auxiliary frame 1, by means of bearings 19. The blade 13 may also be mounted in a pre-loaded condition. Yet in the illustrated embodiment, a torsion bar 20 of tubular shape is arranged inside the hollow cylindrical body 3 with its axis coincident with axis x and has one end rigidly anchored to the central part 3a of the hollow cylindrical body 3, and an outer end rotatably connected by a fluted coupling to bush 18. The torsion bar 20 thus acts as a spring means for opposing any articulation movement of the longitudinal arm 9 around axis x. Naturally, a symmetrical arrangement is provided for the other rear wheel of the motor-vehicle. Yet in this specific embodiment which is shown in the drawings, inside of the two torsion bars 20 associated with the two rear wheels of the motor-vehicle there extends an anti-rolling torsion bar 21 whose opposite ends are each rigidly connected to the respective bush 18. The anti-rolling bar 21 tends to oppose asymmetrical articulation movements of the two longitudinal arms 9 around axis x.

In the suspension according to the invention, each longitudinal arm 9 is further provided with an auxiliary arm 22 (which in the illustrated example is formed in one piece with body 15) ending with one end connected to one bracket 3b (FIG. 1) welded to the hollow cylindrical body 3 outside thereof by an articulated rod element 23. The articulated rod element 23 is constituted by a push-rod adjustable in length by a screw system articulated at its ends to bracket 3b and to the auxiliary arm 22.

Although in the case of the illustrated example blade 13 is constituted by a separate element which is rigidly connected to body 15 of the longitudinal arm 9, this blade may be constituted, at least theoretically, by an element integrated into the body of the longitudinal arm. At the same time, the auxiliary arm 22 could also be constituted by a separate element rigidly connected to body 15 of the longitudinal arm. The longitudinal arm 9 is further provided with a bracket 9a for connection of the lower end of a damping cylinder 24 whose upper end is to be connected to body S of the motor-vehicle.

Finally, to the longitudinal arm 9 there is associated a transverse rod 25, adjustable in length, having its ends respectively articulated at 26 to the wheel support 10, at an area spaced apart from axis r of the wheel, and at 27 to the auxiliary frame 2, adjacent to the medium longitudinal plane M of the motor-vehicle (FIG. 2).

The operation of the above described suspension will be now discussed.

The longitudinal arm 9 is guided in its articulation movements around axis x by the transverse rod 25 and the articulated rod element 23. By varying the length of rod 23 the theoretical camber angle of the wheel may be adjusted. By varying the length of the transverse rod 25 the theoretical wheel toe-in angle is adjusted.

When the motor-vehicle is travelling, during the movements along the vertical direction of the wheel with respects to the motor-vehicle body, the longitudinal arm 9 is on one hand forced to rotate around axis x and at the same time is also forced to move around the articulation 23b of the articulated rod element 23 and articulation 27 of the transverse rod 25. As a result of this, the whole structure of the longitudinal arm 9 moves around a theoretical spherical centre 1CS. The arm 9 is able to tilt around this spherical centre 1CS due to the possibility of blade 13 to be torsionally deformed around its neutral axis y1. The spherical centre 1CS is identified by the intersection of this axis y1 with axis x. By y2 the axis is identified which joins centre 1CS to articulation 26 of the transverse rod 25 on the longitudinal arm 9. The rotation axis d of the transverse rod 25 is formed by the line joining articulation 27 of rod 25 on auxiliary frame 2 to the spherical centre 1CS. With the above described geometry, for each instantaneous movement there exists an instantaneous rotational axis which passes through the spherical centre 1CS and the articulation instantaneous centre Ci of the wheel in the transverse plane containing the wheel axis. The instantaneous rotational axis ai, in a theoretical condition, must have the same angle of the wheel axis r with respect to the horizontal plane. This principle insures the linear variation of toe-in angle and the camber angle as a function of the wheel movement. If the instantaneous rotation axis ai in a theoretical condition is inclined downwardly, during upward movement of the wheel, an oversteering effect takes place (divergence); if said axis is inclined upwardly an understeering effect takes place (convergence). Straight line b and straight line c shown in FIG. 1 have origin in spherical centre 1CS and pass through ends 23a, 23b of the articulated rod element 23. These straight lines b, c cross the transverse plane containing axis r of the wheel (FIG. 4) at two points n, m whose joining line is a vertical line containing the instantaneous rotation centre Ci. The kinematic arrangement remains unvaried when the shape of the various components of the suspension is varied, provided that said axes remain the same.

Figure 4:
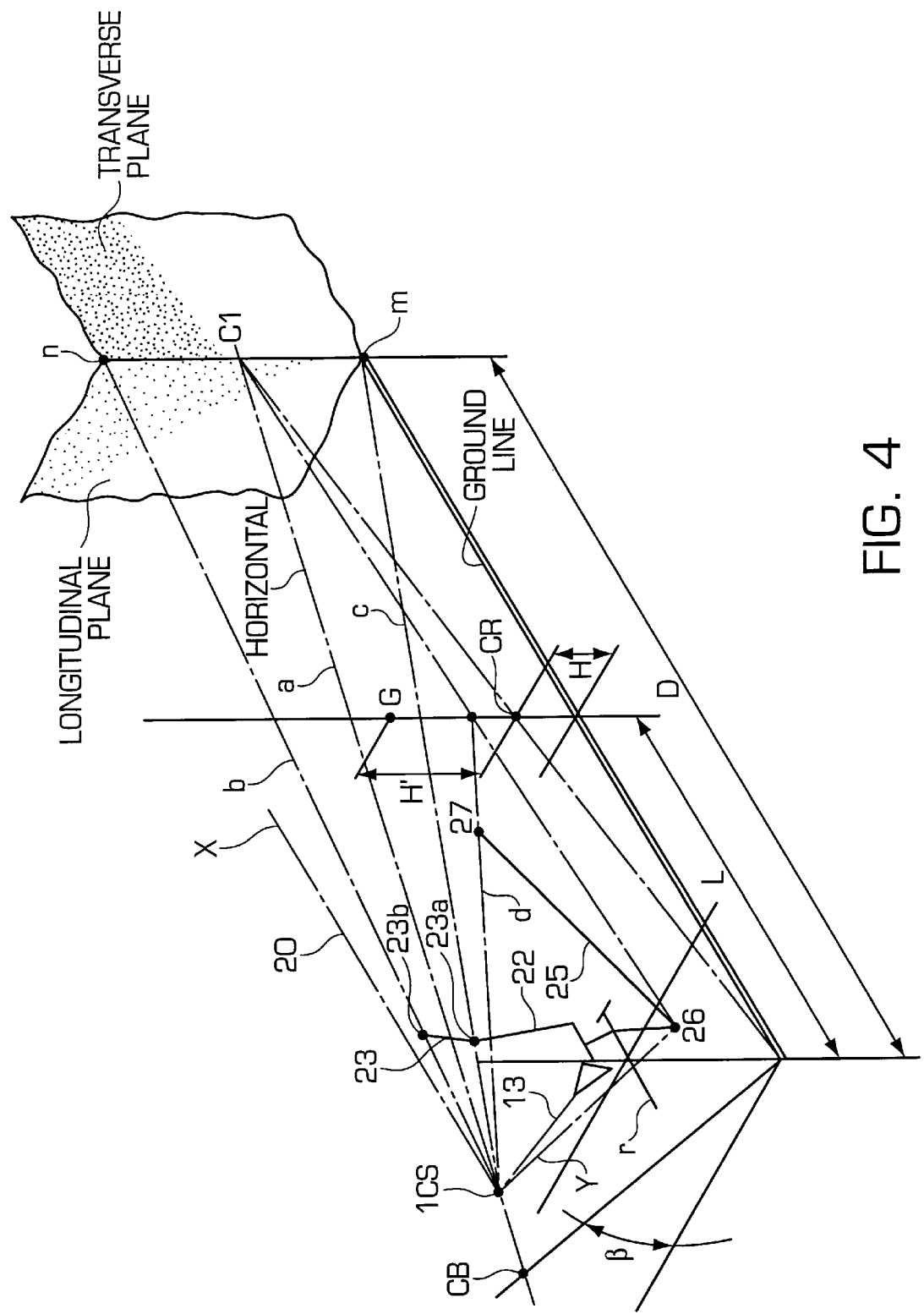
FIG. 4 is a diagrammatic representation of the kinematic arrangement provided with the suspension according to the invention.

Yet with reference to FIG. 4, the illustrated kinematic arrangement substantially corresponds to a rigid body which has a spherical joint to a fixed point 1CS and is connected by spherical joints 3a and 26 to two rigid levers 23 and 25 which are hinged by spherical joints respectively at two fixed points 23b and 27. For a kinematic arrangement of this type, the instantaneous rotation axis ai is defined by the intersection of the planes respectively containing points (1CS-3a–23b) and (1CS-27–26). The straight line intersecting these two planes has the feature of being simultaneously orthogonal to the speed vectors of 3a and 26; i.e. the movement of 3a and 26 is a pure rotation around this straight line ai which therefore is the instantaneous rotation axis. 3a and 26 can not move, since they are rigidly connected to 1CS, which is a fixed point.

The pitching centre CB is determined by the intersection of the instantaneous axis ai with the longitudinal plane of the wheel. It is advantageous that centre 1CS is as close as possible to the wheel longitudinal plane and as high as possible in order to increase the "anti-dive" characteristic of the suspension (i.e. the capacity of opposing a forward pitching movement of the motor-vehicle when braking), this characteristic being directly proportional to angle β (FIG. 4) formed by the longitudinal horizontal direction with the straight line joining centre CB to the contact point of the wheel on the ground.

The linearity characteristic of the variation of the toe-in angle and the camber angle is kept if the oscillating movement of the instantaneous rotation axis ai projected on a transverse plane corresponds to the variation of the camber angle. If the instantaneous rotation axis ai takes an oscillating movement around the spherical centre 1CS, the instantaneous rotation centre Ci moves along the straight line joining points n and m, upwardly and downwardly, as a function of the wheel movement. If the movement takes place with the same time and space values of the wheel movement a condition with a stable rolling centre CR is generated; i.e. the distance of the rolling centre CR from the centre of gravity G is substantially the same during the wheel movement. In order to provide this condition it is advantageous that in a theoretical condition the longitudinal plane meets the transverse plane containing the instantaneous rotation centre Ci at a distance D which is at least twice the length L of the transverse rod.

With reference to FIG. 2, when a lateral force F is present, the lateral yield of the blade 13 enables the longitudinal arm 9 to rotate clockwise (with reference to FIG. 2) with the articulation 26 as rotation centre. This effect gives raise to a toe-in of the wheels with resulting understeering.

Due to the above described features, the suspension system according to the invention satisfies the object of reduced dimensions, reduced weight and a good kinematic and elastic-kinematic behaviour, with camber being taken up during wheel movements, toe-in being controlled during wheel movements and during a curve and with a stable rolling centre.

In the case of the preferred embodiment which has been illustrated, which uses the two torsion bars 20 combined with the torsionally deformable blade 13 as resilient means, further advantages are obtained. For example, it is possible to use this suspension with motor-vehicles with a low floor panel, since it is not necessary to provide a supporting structure for a helical spring. Furthermore, the elastic-kinematic behaviour of the suspension during travel of the vehicle in a curve is such that a variation of positive toe-in of the outside of the curve is obtained (understeering). Also a best distribution of the forces among the various elements is obtained, thus favouring a reduction of their weight.

However, the invention is also applicable to a suspension using resilient means of a type different from that shown in the annexed drawings, for example in the form of a helical spring interposed between each longitudinal arm 9 and the fixed structure of the motor-vehicle.

In the case of the preferred embodiment with a torsion bar, blade 13 and torsion bar 14 operate as two springs in parallel. By designing the geometry of the system and the dimensions of blade and torsion bar, it is therefore possible, at least theoretically, to distribute the rigidity between blade and torsion bar. Naturally, while the principle of the invention remains the same, the details of the construction and the embodiments may widely vary with respects to what has been described and illustrated purely by way of example, without departing from the scope of the present invention.

What is claimed is:

1. Motor-vehicle rear suspension, comprising, for each wheel:
    a longitudinal arm (9) having one end pivotally mounted onto the fixed structure (S) of the motor-vehicle around an axis (x) directed transversally to the longitudinal direction (A) of the motor-vehicle and one end carrying a respective wheel hub (11)
    an auxiliary arm (22) connected at one end to the longitudinal arm (9) and having the opposite end connected to the fixed structure (S) of the motor-vehicle,
    an articulated rod element (23) having one end articulated to the fixed structure around a first axis and an opposite end articulated to said auxiliary arm (22) around a second axis spaced from the first axis,
    a further connecting rod (25) having one end articulated to the longitudinal arm (9) and an opposite end articulated to the fixed structure (S) of the motor-vehicle at a location spaced from said articulated rod and directed tranversally to the longitudinal direction (A) of the motor-vehicle, and
    resilient and damping means interposed between the longitudinal arm (9) and the fixed structure (S) of the motor-vehicle, characterized in that the portion of the longitudinal arm (9) which is pivotally mounted around said transverse axis (x) on the fixed structure (S) of the motor-vehicle is constituted by a torsionally deformable blade (13), arranged substantially in a longitudinal vertical plane, in that the resilient means are constituted by a torsion bar (20) directed along said transverse articulation axis (x) of the longitudinal arm (9), said torsion bar (20) having one end anchored to the fixed structure (S) of the motor-vehicle and the opposite end rigidly connected to the said blade (13) and in that said torsion bar (20) has a tubular shape and has inside thereof an anti-rolling bar (21) rigidly connected at its ends to the two blades (13) associated with the two rear wheels of the motor-vehicle.

2. Suspension according to claim 1, characterized in that said blade (13) and said articulated rod element (23) are connected to one auxiliary frame (1) which in turn is fixed to the fixed structure (S) of the motor-vehicle, this auxiliary frame (1) including a hollow cylindrical body (3) having its axis coincident with said transverse axis (x), inside of which there is rotatably mounted said end of the torsion bar (20) to which the blade (13) is anchored.

\* \* \* \* \*